United States Patent [19]

Bunch

[11] Patent Number: 4,614,350
[45] Date of Patent: Sep. 30, 1986

[54] UTILITY CARRIER

[76] Inventor: Floyd G. Bunch, P.O. Box 163, Paige, Tex. 78659

[21] Appl. No.: 792,640

[22] Filed: Oct. 28, 1985

Related U.S. Application Data

[63] Continuation of Ser. No. 519,533, Aug. 1, 1983, abandoned.

[51] Int. Cl.[4] .............................................. B62B 1/06
[52] U.S. Cl. .................................. 280/47.24; 248/129; 280/47.33; 414/457
[58] Field of Search ............... 280/47.23, 47.24, 47.26, 280/47.17, 47.33; 248/129, 154; 414/444, 457

[56] References Cited

U.S. PATENT DOCUMENTS

| 144,609 | 3/1946 | Quiring | 2/73 |
|---|---|---|---|
| 900,405 | 10/1908 | Markham | 280/47.24 X |
| 1,254,778 | 1/1918 | Comfort | 280/47.24 X |
| 1,255,484 | 2/1918 | Stephens | 414/457 |
| 1,870,163 | 8/1932 | Behling | 280/47.24 X |
| 2,636,627 | 4/1953 | Stoker | 414/457 |
| 2,745,675 | 5/1956 | Haynes | 180/47.24 |
| 3,389,818 | 6/1968 | Rinehart | 414/457 X |
| 3,471,163 | 10/1969 | Swara | 280/47.26 |
| 4,205,937 | 6/1980 | Fawley | 414/457 |
| 4,386,790 | 6/1983 | Kassai | 280/42 X |

FOREIGN PATENT DOCUMENTS

| 4341 | of 1927 | Australia | 280/47.24 |
|---|---|---|---|
| 1117140 | 5/1956 | France | 280/47.24 |
| 1192717 | 10/1959 | France | 414/457 |
| 22733 | of 1901 | United Kingdom | 280/47.24 |
| 18942 | of 1906 | United Kingdom | 280/47.24 |
| 333380 | 8/1930 | United Kingdom | 280/47.26 |
| 614111 | 12/1948 | United Kingdom | 280/47.24 |
| 894982 | 4/1962 | United Kingdom | 280/47.26 |

OTHER PUBLICATIONS

Linda Brandt, *Gardening in Containers*, 3rd Ed. 1977, title page, p. 33, back cover.

*Primary Examiner*—John J. Love
*Assistant Examiner*—Michael Mar
*Attorney, Agent, or Firm*—Arnold, White & Durkee

[57] ABSTRACT

A utility carrier is provided for transporting large objects, particularly plants, with less effort for the user and less wear on the plant. The utility carrier's particular frame structure provides substantial leverage for the user during the lifting of the object, while providing for a consistently vertical orientation for the plant.

15 Claims, 4 Drawing Figures

U.S. Patent   Sep. 30, 1986   4,614,350
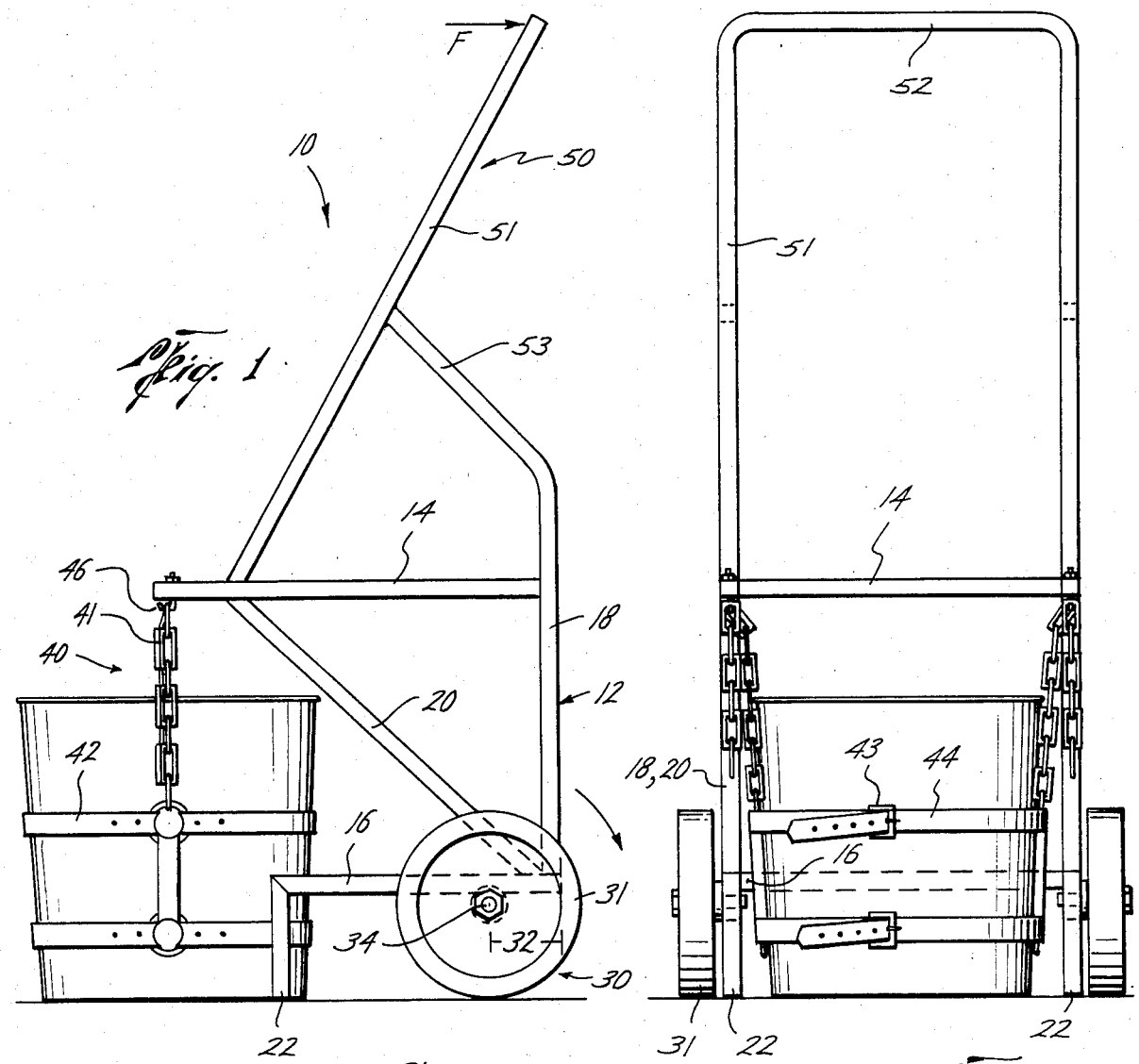
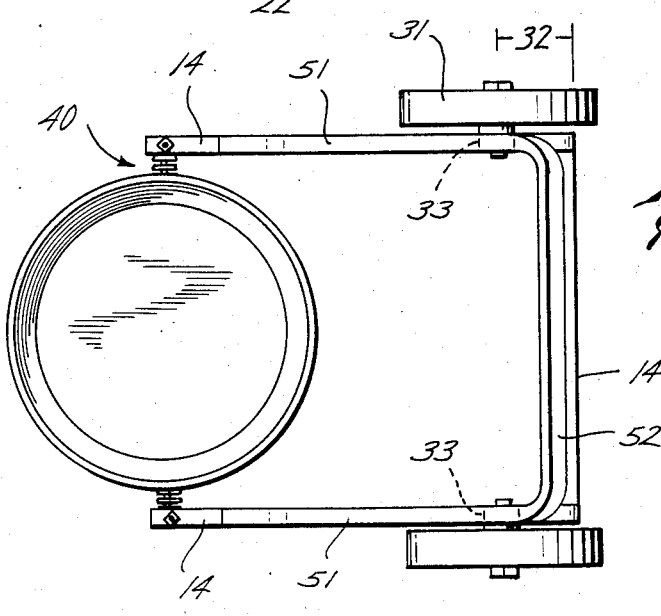

UTILITY CARRIER

This application is a continuation of application Ser. No. 519,533; filed Aug. 1, 1983, now abandoned.

BACKGROUND OF THE INVENTION

The invention relates to utility carriers and more particularly, the invention relates to a utility carrier especially suited for handling large potted plants and other articles having a low center of gravity.

With the increased popularity of plants as a means of decorating, the demand for large plants has increased. These plants often prove difficult to move because of their weight and structure, and when moved by hand or by a traditional dolly, are often damaged.

There are numerous designs of utility carriers for carrying baskets, cans and other objects. Many of these carriers, however, require the direct lifting of the carrier and a portion of the load, which, for large plants, is not desirable. For example, U.S. Pat. No. 1,255,484 to Stephens discloses a truck for moving objects, especially garbage pails. The truck in Stephens, however, suffers the disadvantage for some applications of having to be lifted to the normal operating position. For large and heavy loads, it is believed that such a design places excessive strain on the back of a normal user of such a truck.

U.S. Pat. No. 2,745,675 to Hayes discloses a basket carrying cart. Again, as in the case of Stephens, it appears that the user is directly lifting the object. Also, during the transportation of an object with the device shown in Hayes, the user must maintain an upward force on the cart handle to keep the object elevated.

U.S. Pat. No. 3,389,818 to Rinehart discloses another utility cart or basket carrier. As with the above references, it is believed that in using the cart of Rinehart, the user must lift the weight of the object for use. Additionally, the user must maintain a lifting force on the handle of the carrier during most operations. Still further, it appears that the means for securing the basket may limit the utility of Rinehart for some applications.

U.S. Pat. No. 1,870,163 to Behling also discloses a lift cart wherein the user must directly lift the cart with the object to move the object.

Hence to provide an improved means for moving large potted plants and other heavy objects, it is desirable to provide a means for moving such objects that does not require the user to directly lift the cart or the object. It is also desirable to provide a cart having a versatile means of attaching to the object. Still further, for plants, the cart should carry the plant in an upright manner without damaging the plants.

SUMMARY OF THE INVENTION

The present invention overcomes the prior art disadvantages through a utility carrier for transporting potted plants and other large objects having a low center of gravity which lifts the weight of such a plant or object by leverage over a rolling member and accommodates the carriage of the object over the rolling member such that a minimum of effort is required during movement of such a plant or object. The carrier further maintains such a plant in an upright position such that harm to the plant is minimized or precluded.

The utility carrier is comprised of a generally C-shaped frame having an open side corresponding to the opening in the generally C-shape configuration and a closed side opposing the open side. A rolling support member is rotatably connected to the frame proximate the base of the frame for movably supporting the frame, wherein the rolling support member is positioned a selected distance for leverage from the closed side. A harness assembly for holding such an object is pivotally connected to the C-shaped frame such that the harness assembly extends across the open side and pivots with the weight of the object. The carrier further includes a lever means for tilting the C-shaped frame towards the closed side such that the harness assembly pivots over the rolling support member to centralize the center of gravity of such an object over the rolling support member.

In a preferred embodiment of the present invention, the rolling support member includes a wheel selectively mounted on each of the opposing sides of the frame proximate the base of the frame.

In another preferred embodiment of the present invention, the harness assembly comprises flexible supports selectively mounted to the frame such that the supports pivot in response to gravity. A belt comprised of suitable flexible material is connected between the supports and adapted for fastening to the object. In a more preferred embodiment, the belts are comprised of leather and include buckles and belt holes for adjustably securing such objects.

In a still more preferred embodiment of the present invention, the lever means comprises a handle mounted to the frame such that the lifting of the object is effected by the translation of the user's force to a moment arm about the rolling support member.

In yet another preferred embodiment of the present invention, the base of the generally C-shaped frame includes two short parallel members attached at right angles to the base and directed down from the base, stabilizing the utility carrier when stationary.

The utility carrier of the present invention therefore substantially lessens the effort required to move plants and other tall objects having a low center of gravity by providing a configuration of a carrier which lifts the object by downward pressure on a handle rather than by upward direct lifting. Additionally, the configuration of the carrier is adapted to receive and support a tall plant within the C-shaped frame without damaging the plant. Also, the pivotal connection of the harness assembly causes the plant to be carried in an upright manner in use with the top of the plant extending away from the carrier frame to preclude damage of the plant by contact with the frame. Hence, the present invention provides a carrier which eases use, while minimizing damage to the plant or object.

BRIEF DESCRIPTION OF THE DRAWINGS

This invention will further be illustrated in reference to the appended drawings which illustrate a particular embodiment of the utility carrier in accordance with this invention.

FIG. 1 is a side view of the utility carrier of the present invention illustrating the fastening of a plant in the harness assembly.

FIG. 2 is a front view of the utility carrier illustrated in FIG. 1.

FIG. 3 is a top view of the utility carrier illustrated in FIG. 1.

FIG. 4 is a plan view of an alternative embodiment of the rear cross members of the C-shaped frame of the carrier of the present invention modified to provide for adjustment of the width of the carrier.

DESCRIPTION OF THE PREFERRED EMBODIMENT

The present invention is disclosed in conjunction with a preferred embodiment. It should be understood, however, that variations of this embodiment may be taken in accordance with the spirit and scope of the invention.

The preferred embodiment of the utility carrier 10 is generally represented by a generally C-shaped frame 12, a rolling support member 30, a harness assembly 40 and lever means 50.

Referring to FIGS. 1, 2 and 3, the generally C-shaped frame 12 may have a number of configurations which have members on essentially three sides and which are open on one side. For example, a U-shaped frame or a modified V-shaped frame may be utilized. These and other suitable shapes open on one side to receive a plant or other objected may be utilized in accordance with the present invention.

As shown in the FIGURES, in the preferred embodiment, the generally C-shaped frame 12 includes an upper C-shaped member 14 and a lower C-shaped member 16. The upper C-shaped frame 14 and the lower C-shaped frame 16 each have a generally rectangular configuration open on one end. In the preferred embodiment, the upper C-shaped frame 14 and the lower C-shaped frame 16 have substantially identical widths, while the length of the opposing sides of the upper C-shaped frame 14 is greater than the length of the sides of the lower C-shaped frame 16. The upper C-frame 14 and lower C-frame 16 are interconnected by a pair of vertical members 18 extending between the closed corners of the C-frames such that the C-frame 14 and C-frame 16 are disposed parallel to each other in substantial alignment along their closed ends.

The upper C-frame 14 and the lower C-frame 16 are further interconnected by a cross brace 20 connected on each side of the C-frames 14 and 16 and extending from a point proximate the open end of the upper C-frame 14 to a point near the closed end of the C-frame 16.

The generally C-shaped frame may further include a rest support 22 for supporting the frame with the rolling support 30. In the preferred embodiment a rest support 22 is connected to the lower C-frame 16 on each of the opposing sides near the open end. The rest support 22 is mounted to the lower side of the C-frame 16 to extend downwardly in use.

The utility carrier 10 further includes a rolling support member 30 rotatably connected to the generally C-shaped frame 12 proximate the base or lower C-frame 16 of the frame 12 for movably supporting the frame 12. The rolling support member 30 is positioned a selected distance for leverage from the closed sides or aligned closed ends of the C-frames 14 and 16. In the preferred embodiment, the rolling support member 30 comprises a wheel 31 rotatably mounted to each side of the lower C-frame 16 a selected distance 32 from the closed end of the C-frame 16 by means of an axle stub 33 or other suitable axle assembly. The length of the selected dimension 32 is not critical, but must be great enough to provide an effective moment arm between the vertical support 18 and the center of rotation of the rolling support member 30 such that the translation of force along the vertical member 18 tends to rotate the generally C-shaped frame 12 around the axis of rotation 34. It will be appreciated, however, that length 32 may be limited by the outermost radial dimension of the rolling support member 30 so that the generally C-shaped frame 12 does not bottom out during normal operation.

In the preferred embodiment, the rolling support member 30 is comprised of opposing wheels 31. It will be appreciated, however, that other suitable rolling support members may be utilized in accordance with the present invention.

Referring still to FIGS. 1-3, the utility carrier further includes a harness assembly 40 for holding an object such as a large potted plant. The assembly 40 is connected to the C-shaped frame 12 such that the assembly 40 extends across the open end of the upper C-frame 14 and such that the assembly 40 pivots with the weight of the object to be carried such that the object will remain upright if it has a low center of gravity. The assembly 40 may further be connected to the frame for vertical adjustment to accommodate various sizes of planters.

In the preferred embodiment, the harness assembly is comprised of a chain 41 secured by a hook 46 to each side of the upper C-frame 14 proximate the open end of the open C-frame 14. Each chain 41 is further interconnected with the belt assembly 42 which is adapted for adjustable fastening to an object 45. In the preferred embodiment, the belt assembly comprises a network of leather strapping having a buckle 43 and a plurality of fastening holes 44 for adjustment of the harness network 42. Further, in the illustrated embodiment, vertical adjustment of the harness assembly 40 is provided by selectively attaching a desired link in the chain 41 to attain the desired length of chain 41.

In the preferred embodiment, the belt assembly 42 is comprised of leather. It will be appreciated, however, that polyester and other suitable materials may be used in the construction of the belt assembly 42.

The utility carrier 10 also includes a lever means 50 for tilting the C-shaped frame 12 toward the closed side such that the harness assembly 40 pivots over the rolling support member 30 to centralize the center of gravity of an object 45 over the rolling support member 30 in use. The effect of the weight of the object 45 may thereby be negated through a balancing of the object 45 over the rolling support member 30 in use.

In the preferred embodiment, the lever means 50 includes an elongated C-shaped frame handle 51 secured to each side of the upper C-frame 14 proximate the open end of the C-frame 14. The handle 51 extends angularly upwardly and rearwardly from the upper C-frame 14 such that the cross member 52 of the handle 51 aligns vertically with the closed ends of the C-frames 14 and 16 as shown in FIG. 3. The lever means 50 further includes a bracing member 53 secured to each side of the handle 51 at a selected point along the length of the handle 51 and extending to the corresponding vertical support 18 such that the bracing member 53 interconnects a selected point of the handle 51 with the vertical support 18. The bracing support 53 thereby further interconnects the handle member 51 with the closed side of the utility carrier 10 such that the application of a force F shown in FIG. 1 in a generally rearward direction, or toward the closed side of the frame 12, exerts a force on the moment arm created by the selected distance 32 between the rolling support member and the closed end or closed side of the frame 12. This force, in turn, tends to rotate and tilt the carrier 10 around the axis of the rolling support member 30 toward the closed side.

Accordingly, when the carrier of the present invention is utilized, the user may lift the object by simply pulling backward and downward on the handle 51. The leverage created by the handle 51 will then lift the plant or other object 45 to a balanced condition over the rolling support member 30. The plant 45 may then be moved to a desired location by means of the rolling support member 30.

Referring now to FIG. 4, an alternative embodiment of the rear cross members is illustrated in which the cross members are modified to provide for an adjusting means for adjusting the width of the carrier 10. While in FIG. 4, only the cross member 52 is shown, it will be understood that the adjusting means must be adapted to the closed ends of the C-frames 14 and 16 to accommodate uniform width adjustment of the entire carrier 10.

As shown in FIG. 4, in the alternative embodiment, the cross member 52 is divided at approximately its longitudinal center. The adjusting means then includes a sleeve 57, into each end of which is slidably disposed an end of the divided cross member 52. The sleeve 57 has an inner configuration slightly larger than and complementary to the outer configuration of the cross member 52 such that each end of the cross member 52 fits snuggly within the sleeve 57 to preclude play between cross member 52 and the sleeve 57. The sleeve 57 further includes set screws 58 mounted at each end of the sleeve 57 to secure the cross member 52 within the sleeves 57 when the desired width is obtained. Accordingly, the present invention further includes a means for adjusting the width of the carrier to accommodate various widths of plants and other objects.

The instant invention has been disclosed in connection with a specific embodiment. However it will be apparent to those skilled in the art that variations from the illustrated embodiment may be undertaken without departing from the spirit and scope of the invention. For example, the wheel 31 could be replaced by large casters or rollers. Additionally, the front rest support 22 could be replaced by wheels or other suitable structure to provide stability to the carrier when not in use. These and other variations will be apparent to those skilled in the art and are within the spirit and scope of the invention.

What is claimed is:

1. A utility carrier for transporting potted plants or other tall objects having a low center of gravity, comprising:
    a frame having a generally C-shaped configuration, the frame having a top, a base, an open side corresponding to the opening in the generally C-shaped configuration, a substantially vertically extending closed side opposing the open side when the carrier is in a rest position, and opposing sides extending on each side between the open and closed sides;
    a rolling support member rotatably connected to the frame proximate the base of the frame for movably supporting the frame, said rolling support member being positioned between the open side and the closed side to have an axis of rotation a selected distance for leverage from the closed side;
    a rest support member mounted on the base of the frame at the open side of the frame, the rest support member being positioned to extend downwardly in use to support the frame with the rolling support member;
    a harness assembly for holding such an object, the assembly being connected to the C-shaped frame such that the harness assembly extends across the open side, and pivots over the axis of rotation of the rolling support member with the weight of such an object when the frame is tilted in use; and
    lever means for tilting the C-shaped frame towards the closed side such that the harness assembly pivots over the axis of rotation of the rolling support member to centralize the center of gravity of such an object over the rolling support member, said lever means comprising an elongated handle having a first end and a second end, the handle being secured at the first end to the frame proximate the open side of the frame and being angled upwardly and towards the closed side in use, the lever means further comprising a bracing member extending between the handle and the closed side to interconnect the handle with the closed side, the bracing member being connected to the handle at a selected point along the handle between the first and second ends of the handle and extending angularly to a point on the top of the closed side of the frame such that a moment arm is created between the selected connecting point of the handle and the second end of the handle such that the application of a force on the handle generally toward the closed side of the frame exerts a force on the moment arm created by the selected distance between the rolling support member and the closed side to rotate and tilt the carrier around the rolling support member toward the closed side.

2. The utility carrier of claim 1 wherein the rolling support member includes a stub axle on each of the opposing sides of the frame proximate the base of the frame and a wheel mounted for rotation on each stub axle.

3. The utility carrier of claim 1 wherein the harness assembly comprises:
    a pivotal support member secured to each of the opposing sides of the frame proximate the open side; and
    a belt assembly secured between the support members, the belt assembly being adapted for adjustable fastening to such an object.

4. The utility carrier of claim 3 wherein the belt assembly is comprised of leather straps including a buckle for adjustable fastening to such an object.

5. The utility carrier of claim 3 wherein the belt assembly is comprised of polyester strapping.

6. The utility carrier of claim 1 further comprising a connecting brace mounted along each of the opposing sides of the frame, each connecting brace being mounted on its respective opposing side to extend from proximate the point of securing the handle to the frame proximate the open side to a point on the base of the frame along the selected distance between the rolling support member and the closed side.

7. The utility carrier of claim 1 further comprising a means for adjusting the width of the carrier.

8. The utility carrier of claim 1 further comprising a means for vertically adjusting the harness assembly.

9. A utility carrier for transporting potted plants or other tall objects having a low center of gravity, comprising:
    a frame having a generally C-shaped configuration, the frame having a top, a base, and an open front corresponding to the opening in the generally C-shaped configuration, and further including a back member disposed opposite the open front, the back member being substantially vertical when the carrier is in a rest position, and opposing side members connected to the back member to the open front;

a rolling support member rotatably connected to the side members of the frame proximate the base of the frame for movably supporting the frame, said rolling support member being positioned between the front and the back member to create an axis of rotation disposed a selected distance from the closed side for leverage from the closed side;

a rest support member mounted on the base of the frame at the open side of the frame, the rest support member being positioned to extend downwardly in use to support the frame with the rolling support member;

a harness assembly for holding such an object, the assembly being connected to the opposing side members proximate the front of the frame such that the harness assembly extends substantially across the front of the frame when the frame is not tilted in use, and pivots over the axis of rotation of the rolling support member with the weight of such an object when the frame is tilted in use; and lever means for tilting the C-shaped frame towards the back member such that the harness assembly pivots over the axis of rotation of the rolling support member to centralize the center of gravity of such an object over the rolling support member in use, said lever means comprising an elongated handle having a generally C-shaped configuration having a first open end and a second closed end, the handle being secured at the open end to each of the side members of the frame proximate the front of the frame such that the handle substantially aligns vertically with the C-shaped frame, the handle being further angled upwardly and towards the closed side in use, the lever means further comprising a bracing member extending between the handle and the back member to interconnect the handle with the back member, the bracing member being connected to the handle at a selected point on the handle between the first open end and the second closed end and extending angularly to a selected point on the top of the back member such that a moment arm is created between the selected connecting point of the handle and the second closed end of the handle in which the application of a force on the second closed end of the handle generally toward the closed side of the frame exerts a force on the moment arm created by the selected distance between the rolling support member and the back member to rotate and tilt the carrier around the rolling support member toward the back member.

10. The utility carrier of claim 9 wherein each side member includes a stub axle secured thereto and wherein the rolling support member includes a wheel mounted for rotation to the stub axle of each of the side members of the frame, the stub axles being disposed such that the axes of rotation of the respective wheels are substantially aligned.

11. The utility carrier of claim 10 wherein the harness assembly comprises:

a pivotal support member secured to each of the side members of the frame proximate the front of the frame; and a belt assembly secured between the pivotal support members, the belt assembly being adapted for adjustable fastening to such an object.

12. The utility carrier of claim 9 further comprising a connecting brace extending from proximate the point of securing the handle to the side members of the frame to a point on the side members along said selected distance between the back member and the axis of rotation of the rolling support member.

13. A utility carrier for transporting potted plants or other tall objects having a low center of gravity, comprising:

a frame having a generally C-shaped configuration, the frame including an upper generally C-shaped member open on one side and a lower generally C-shaped member open on one side, the upper and lower generally C-shape members being connected by a vertical support member with the open sides of the upper and lower C-shaped members aligned such that the upper and lower C-shaped members form a cavity open on one side;

a rolling support member rotatably connected to the lower generally C-shaped member for movably supporting the frame, the lower generally C-shaped member having a closed back opposing the open side of the lower generally C-shaped member wherein the rolling support member is positioned between the open side and the closed back of lower generally C-shaped member to have an axis of rotation a selected distance from the closed back;

a rest support member mounted on the lower generally C-shaped member at the open side of the frame, the rest support member being positioned to extend downwardly in use to support the frame with the rolling support member;

a harness assembly for holding such an object or plant, the assembly being connected to the upper generally C-shaped member approximately at the open end of the generally C-shaped member such that the harness assembly extends across the open side of the cavity formed by the upper and lower genrally C-shaped members, the harness assembly further being connected to the upper generally C-shaped member such that the harness pivots over the axis of rotation of the rolling support member with the weight of such an object or plant when the frame is tilted in use; and lever means for tilting the open side of the cavity of the frame upwardly such that the harness assembly pivots over the axis of rotation of the rolling support member in use to centralize the center of gravity of such an object or plant over the rolling support member, wherein the upper generally C-shaped member has a closed back opposing the open side of the upper generally C-shaped member and wherein the vertical support member connects the closed back of the upper generally C-shaped member with the closed back of the lower generally C-shaped member and in which the lever means comprises an elongated handle having a generally C-shaped configuration having a first open end and a second closed end, the handle being secured at its open end to the upper generally C-shaped member at a point between the open side and the closed back of the upper generally C-shaped member proximate the open side of the upper generally C-shaped member such that the handle is substantially aligned with the upper and lower generally C-shaped members to form a cavity open on one side and such that the handle extends angularly upwardly from the upper generally C-shaped member, the handle further being secured to the vertical support member by a bracing member extending from a selected point on the handle between the first open end and the second closed end to the vertical support member such that a moment arm is created between the selected connecting point of the handle and the second closed end of the handle in which the application of a force on the second closed end of the handle generally toward the closed back of the lower generally C-shaped member exerts a force on a moment arm created by the selected distance between the axis of rotation of the rolling support member and the closed back to rotate and tilt the carrier around the rolling support member.

14. The utility carrier of claim 13 wherein the lower generally C-shaped member has opposing sides extending from the closed back to the open side and wherein the rolling support member comprises a wheel rotatably mounted on a stub axle secured to each of the opposing sides of the lower generally C-shaped member, the stub axles being disposed such that the axes of rotation of the respective wheels are substantially aligned.

15. The utility carrier of claim 13 further comprising a connecting brace extending between a side of the upper generally C-shaped member and a vertically corresponding side of the lower generally C-shaped member, the connecting brace being connected to the upper generally C-shaped member at a point corresponding vertically to a point of attachment of the handle to the upper generally C-shaped member and being connected to the lower generally C-shaped member at a point between the position of the rolling support member and the closed back of the lower generally C-shaped member.

* * * * *